2,728,941

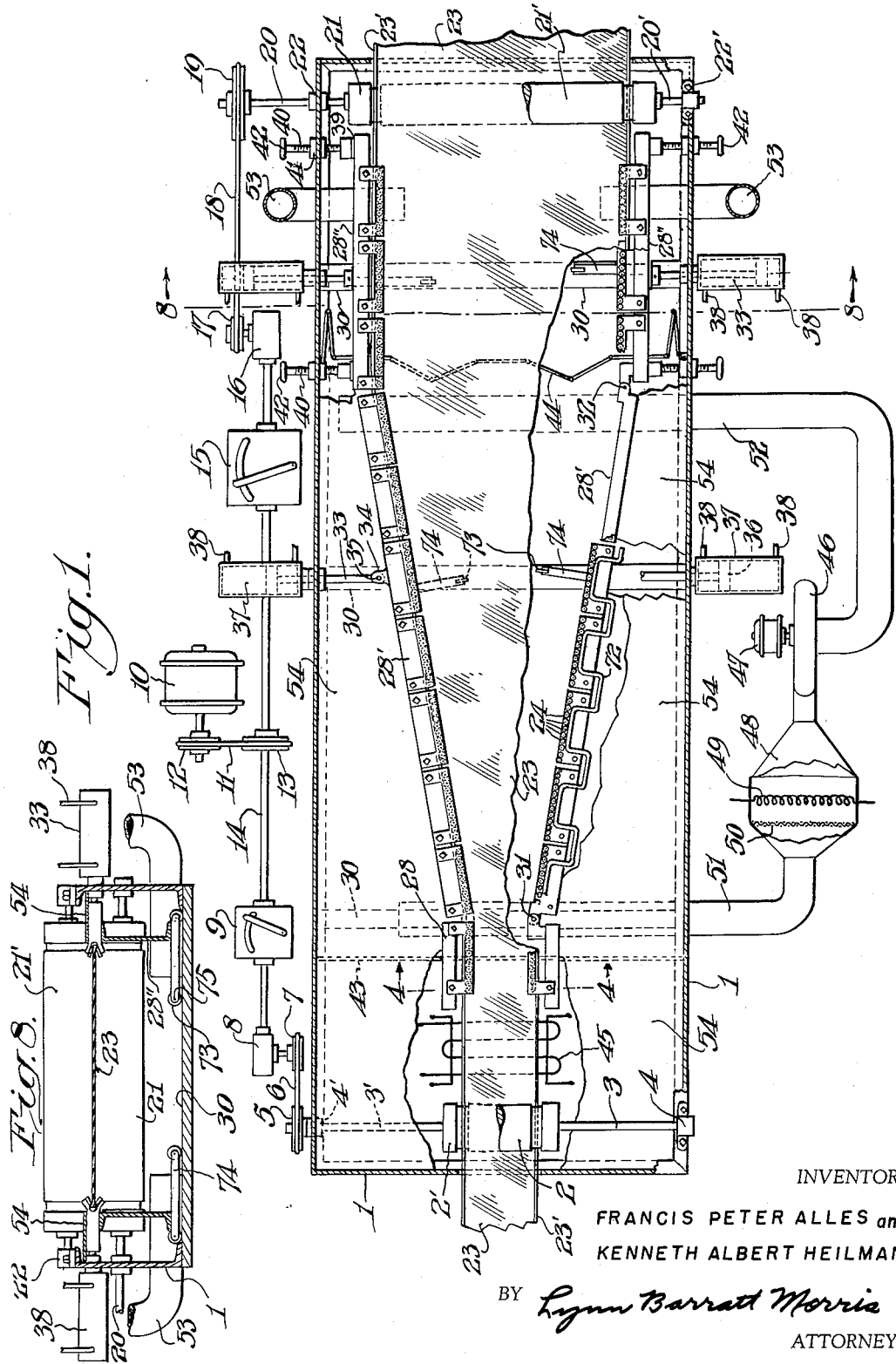

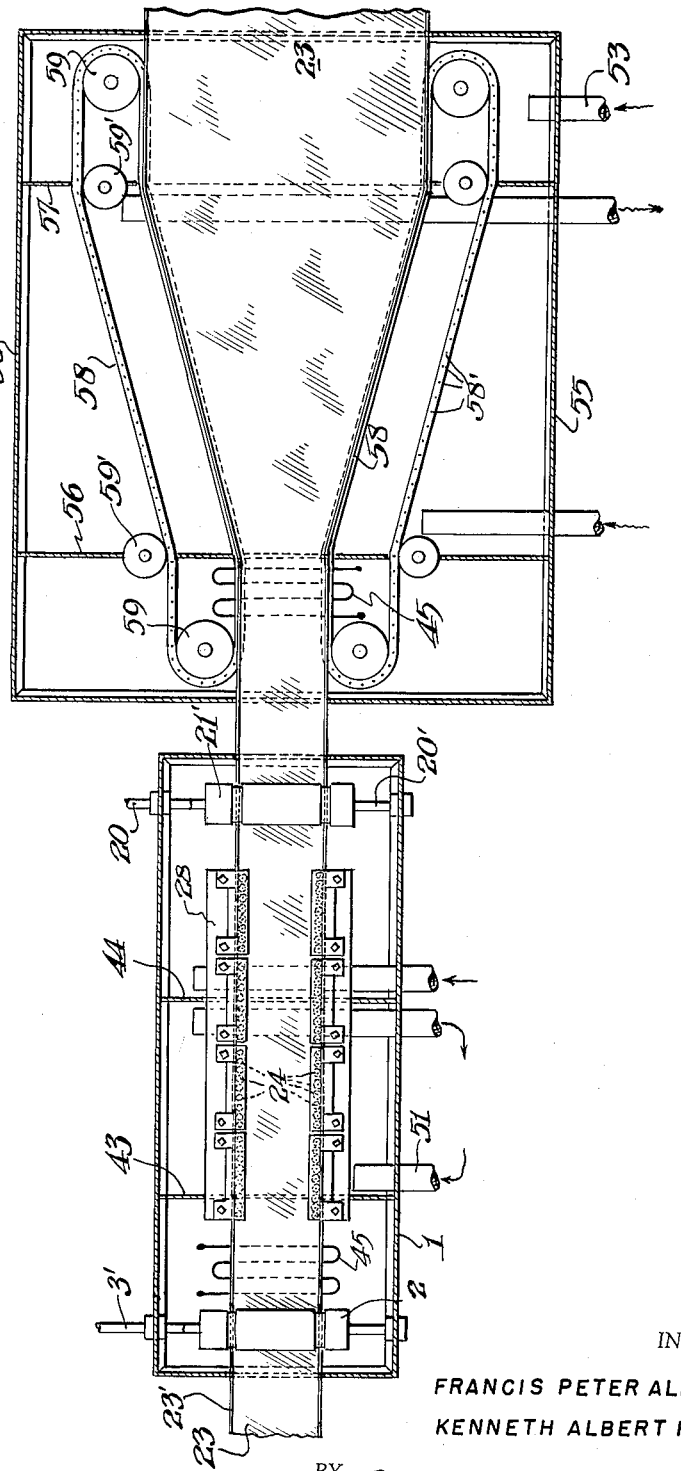

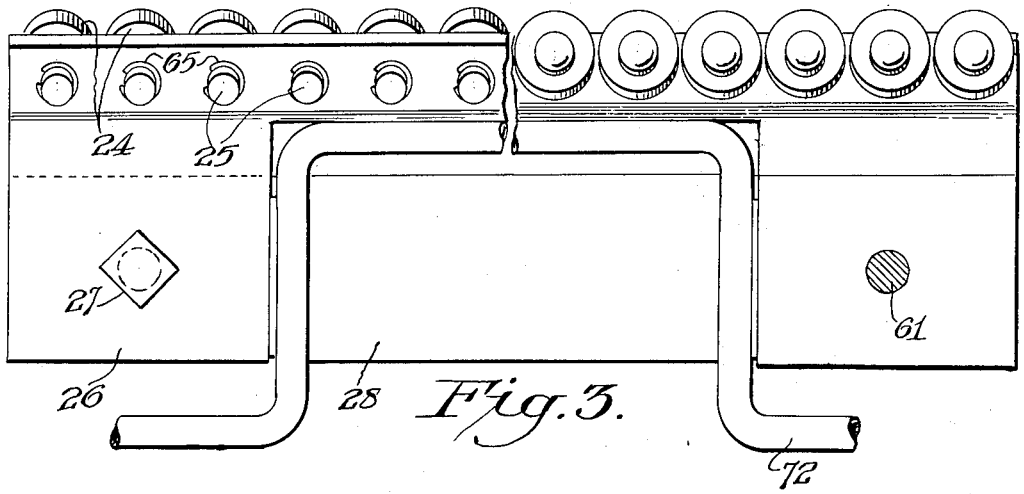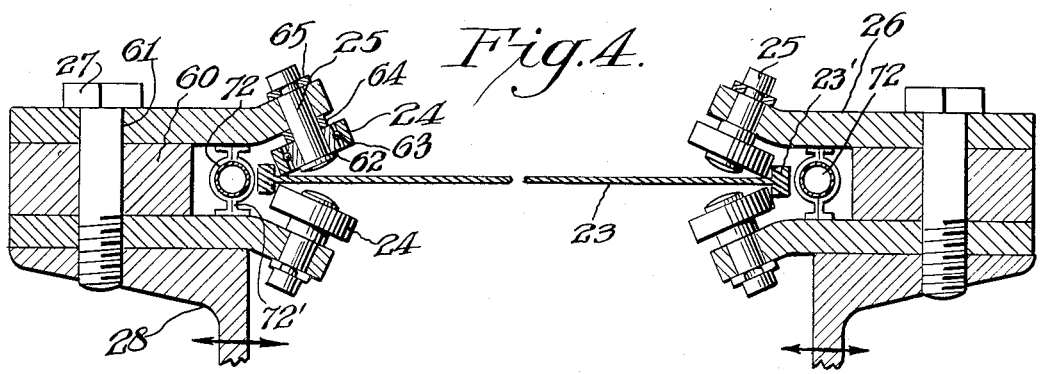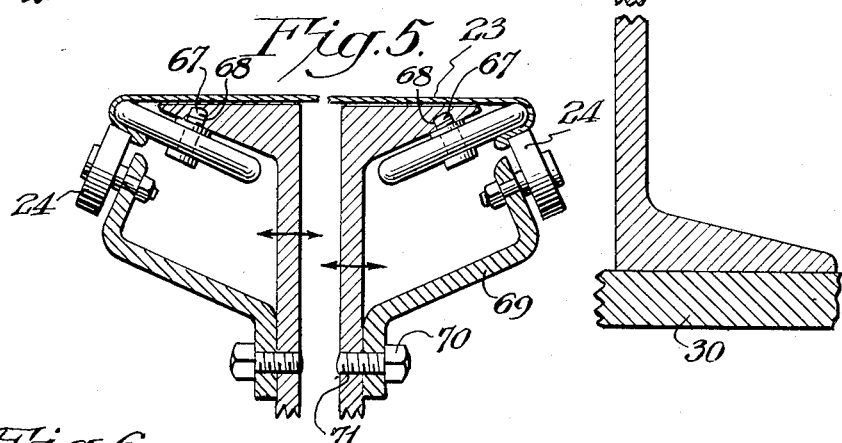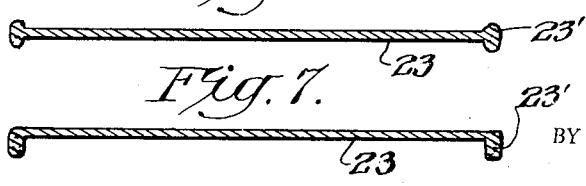
INVENTORS
FRANCIS PETER ALLES and
KENNETH ALBERT HEILMAN
BY Lynn Barrett Morris
ATTORNEY United States Patent Office 2,728,941
Patented Jan. 3, 1956

APPARATUS FOR STRETCHING WEBS

Francis Peter Alles, Westfield, and Kenneth Albert Heilman, Florham Park, N. J., assignors to E. I. du Pont de Nemours & Company, Wilmington, Del., a corporation of Delaware Application August 12, 1952, Serial No. 303,908

11 Claims. (Cl. 18—1)

This invention relates to an apparatus for stretching webs and films. More particularly, it relates to an apparatus for stretching thermoplastic films. Still more particularly it relates to an apparatus for continuously stretching thermoplastic films in two directions to form an oriented sheet.

Various types of apparatus for stretching films and webs are known and their designs vary quite widely depending upon the material to be stretched. Thus, an apparatus which is suitable for stretching fabric webs is not always suitable for stretching coherent films or foils. In the case of thermoplastic materials, still further problems arise because the material must be maintained in a plastic state during the stretching operation. The stretching of such materials is also difficult due to the high coefficient of friction of such materials while in the plastic state.

An object of this invention is to provide an improved apparatus for stretching webs. A more specific object is to provide an improved apparatus for stretching webs of thermoplastic material. Another object is to provide a simple and effective apparatus for stretching films composed of thermoplastic organic materials. Yet another object is to provide such an apparatus which produces uniform results continuously over a long period of time. A further object is to provide such an apparatus whereby the amount of lateral and longitudinal stretching can be regulated to close tolerances. A still further object is to provide such an apparatus which can be operated in a continuous manner by the ordinary technician. Still other objects will be apparent from the following specification.

The apparatus of this invention will now be described with reference to the accompanying drawings which form a part of this specification. In the drawings which illustrate practical embodiments of the invention:

Fig. 1 is a top plan view with parts in section of one type of stretching apparatus embodying the invention, Fig. 2 is a top plan view of an alternative stretching apparatus embodying the invention, Fig. 3 is a top plan view of a web guiding and stretching unit showing the upper and lower guide rollers, bracket supports and a temperature regulating tube, Fig. 4 is a partial cross-sectional view taken along the lines 4—4 of Fig. 1 with parts in elevation and a different cooling tube arrangement, Fig. 5 is a cross-sectional view similar to Fig. 4 of an alternative web guiding and stretching unit, Fig. 6 is a cross-sectional view of one type of thermoplastic film to be stretched, Fig. 7 is a cross-sectional view of an alternative form of thermoplastic film to be stretched, and Fig. 8 is a sectional view taken along the line 8—8 of Fig. 1.

Referring now to the drawings wherein similar reference numerals refer to similar parts throughout the several views and starting with Fig. 1 the novel stretching apparatus has a rectangular frame 1 which may consist of a structural steel channel. Near one end of the frame there is disposed a pair of feed rolls 2 and 2'. The upper feed roller 2 is broken away to show the other one 2' which is disposed directly beneath it. The rolls are preferably adjustably mounted and spaced apart a distance equal approximately to the thickness of the film to be stretched. The upper roll 2 is provided with a suitable shaft 3 journaled in bearings 4 which are mounted on the frame. The lower shaft 3' is similarly journalled in bearings 4'. An outer end of lower shaft 4' is provided with a pulley 5 that is driven by belt or chain 6 which passes over a similar pulley or sprocket 7 that is operatively associated with a right angle speed reducing unit 8. This unit is connected to a variable speed reducing unit 9. The latter unit is driven by means of motor 10 and belt 11 that passes over motor pulley 12 and pulley 13 which is affixed to the line shaft 14 connecting said reducing unit. The line shaft also extends to another variable speed reducing unit 15, that is in turn, connected to a right-angle reducing unit 16 which is provided with a driving pulley 17 and connected through belt or chain 18 to pulley or sprocket 19 which is mounted on a drive shaft 20, which, in turn, drives the lower outlet roll 21. The shaft is journalled in bearings 22 which are suitably mounted on the frame 1. Immediately above the lower roller is a coacting roller 21' of similar size which is spaced from lower outlet roll 21 a distance approximately equal to the thickness of the stretched web. The upper roller 21' is mounted on shaft 20' journalled in bearings 22'. Thus, a pair of gripping rollers is provided to pull the web through the entire apparatus. The speed of feed rolls and outlet rolls are regulated separately by means of the variable speed reducers so that outlet rolls 21 and 21' may rotate at a speed equal to or greater than feed rolls 2 and 2'. If the speed of rolls 21 and 21' exceeds that of rolls 2 and 2' tension is produced on the film and causes it to stretch longitudinally.

With regard to the pairs of feed rolls and outlet rolls the upper members in each pair need not be driven but may be idler rolls. The bearings for these rolls are shown schematically in Fig. 1 but in actual practice may be mounted on adjustable supports and the upper bearing spring-loaded to adjust to the thickness of the web or film to be stretched.

The thermoplastic film 23 to be stretched has thickened or beaded edges 23'. Suitable beaded edges are more fully shown in Figs. 4, 5, 6, and 7. The surfaces of the feed rolls 2 and outlet pull rolls 21 are provided with grooves or channels that are disposed immediately above and/or below the beaded edges of the film.

Transverse stretching of the web is accomplished by means of two rows of pairs of small rollers 24 which are rotatably mounted along the axis of the path of the desired travel of the beaded edge of the film. These rollers are journalled on stub shafts 25, as shown more clearly in Figs. 3 and 4, that are mounted on a plurality of U-shaped brackets 26 which are attached by means of bolts 27 to suitable rails 28, 28' and 28" which, in turn, are suitably mounted on frame cross-supports 30.

In the embodiment of the invention shown in Fig. 1 rails 28, which are in the form of structural steel channels, as shown more clearly in Fig. 3, are disposed parallel to the path of the center of the film. Pairs of brackets 26 are similarly disposed on said rails so that the edges of the film travel in straight parallel lines between the first and last pairs of rollers. The stub shafts 25 of coacting pairs of rollers are disposed at opposite angles from horizontal so that the edges of the rollers at their closest points abut the beaded edge of the film.

Rails 28' which are disposed at diverging angles from the path of the film are pivotally mounted at the inner end to a frame cross-support 30 by means of pivot pins 31. The axis of the pivot pins is equidistant from adjacent rollers and the respective pin axis should intersect the path of the bead of the film. The outer ends of the rails 28' are connected to rails 28" similarly by means of pivot pins 32 and the latter rails are essentially parallel to the axis of the path of the film.

Rails 28' are provided with adjusting rods 33, which are pivotally mounted in channelled lugs 34 by means of pivot pins 35 which extend through the channel walls and the rods. They may be affixed to either the rods or walls, if desired. The outer ends of the rods, which may be longer than shown, are connected to pistons 36 in hydraulic cylinder 37 which have fluid connections 38 near each end. The adjusting rods and cylinders are preferably disposed about two-thirds the total length of rails 28' from the pivoted ends.

Rails 28" are similarly provided with hydraulically adjustable rods 33 near their centers. The rails 28" rest on carriages (later described) which are disposed on cross-supports 30 so that they are capable of sliding movement which is accomplished by means of the hydraulic cylinders and rods. The ends of these rails, however, are provided with flat bosses 39 which constitute stops for the ends of adjustable screws 40, which may be longer than shown, pass through threaded holes 41 in frame 1. The area adjacent the threaded portion in the frame can be enlarged as shown for purposes of strength. The outer end of each adjustable screw, which may be longer than shown, has an enlarged head or handwheel 42 so as to permit easy adjustment.

The entire apparatus, below the web to be stretched, is enclosed by means of walls formed by the central portion of channel frame 1 and horizontal cover plates that fill the space between the roller units and the inside wall of the channel frame. The enclosed chamber is divided into separate zones so that the temperature can be regulated to different degrees as the web passes from the feed to the outlet rolls. Thus, a vertical transverse wall 43 is placed at a point just beyond that at which the web enters into contact with the first few pairs of guiding rollers 24. A further vertical transverse wall 44 is placed in the chamber at the point where the web has received its maximum lateral stretching. This wall, as shown, is flexible, consisting of hinged flat sheets, so that it can be shifted along the chamber between the walls of the frame to various desired points. Wall 43 may also be flexible like 44 if desired.

As stated above, the enclosed stretching apparatus is divided into three temperature controlled zones by reason of vertical transverse walls 43 and 44 and the side and end walls of the frame 1. The web temperature in the first zone is regulated by means of a heating unit 45 consisting of an electrical resistor capable of emitting infra-red radiation. The temperature in the central zone between walls 43 and 44 is regulated by means of heated air which is circulated by means of centrifugal fan 46 which is rotated by means of electrical motor 47. The exhaust end of the fan blows air into the diconical chamber 48 which is provided with steam heating coils 49 and filters 50. The heated and filtered air then passes by means of duct 51 into the intermediate chamber. The exit end of this duct is preferably disposed near one end of the chamber. The air is returned from this chamber by means of duct 52.

The third chamber is preferably closed to the atmosphere at its upper part between the web and side walls to prevent entry of dust particles, lint, etc. Its temperature is regulated by means of air currents passing through the chamber and into the room. Cooling air, for instance, can be fed into this chamber by means of duct 53. The upper part of the three chambers are preferably covered with sheet material or plates 54 between the edges of the web and walls. It will be noted that this plate is cut away at the points where the supporting brackets for the guide rollers are bolted to the rails.

In Fig. 2 there is shown an alternative device in which a group of rollers 24 are mounted on a single rail that is disposed parallel to the axis of the path of travel of the web or film. In this form of device the parallel rows of guide rollers maintain the transverse dimension of the web or film by means of their restraining guiding action that prevents a "necking-down" of the web. By increasing the amount of longitudinal stretching one can attain a substantial orientation of the film. In this form of apparatus, there are likewise provided separate temperature regulating zones by means of vertical transverse walls 43 and 44. The entrance zone is provided similarly with an infra-red preheating unit and the central zone is provided with a pump and heating and filtering means (not shown) similar to that shown in Fig. 1. Cooling air is applied to the third chamber as previously described.

Longitudinal stretching of the web or film is accomplished in the apparatus of Fig. 2 by means of the difference in speed of the feed rolls 2 and outlet pull roll 21. Transverse stretching of the web or film can be attained by passing it into a lateral stretching unit or tenter frame consisting of a frame 55 which is likewise provided with vertical transverse walls 56 and 57 so that it can be divided into separate temperature-regulated zones. The first zone is provided similarly with an infra-red heating unit 45 and the second zone is provided similarly with ducts, a pump and a unit for heating and filtering air similar to that of Fig. 1. The third zone is provided with a duct 53 for supplying cooled air. Transverse stretching is accomplished in this zone by means of continuous chains 58 which travel around rotating sprockets 59 and guide rollers 59', at least one of each pair being driven by power from a suitable source. The upper surface of each chain is provided with a series of uniformly spaced pins 58' which engage with the film and pull it along a designated path. As shown in Fig. 2, the path is parallel to the axis of the web for a short distance then at a diverging angle and then again parallel to the axis of the web. While a pin chain is shown, there can be substituted other known means for engaging or gripping the appropriate edge of the web, e. g., a series of spaced clamps or grippers. In such case means will be provided for opening or closing the grippers at the appropriate points. In place of a chain, a belt with suitably mounted pins or gripping devices could be used.

Referring now more particularly to Figs. 3, 4, and 5, a group of guide rollers 24 are rotatably mounted on U-shaped brackets 26. The brackets in each pair may be identical in construction as shown in Fig. 4 but they are reversed in position. Between the U-shaped brackets there are disposed spacers 60. These spacers can vary in thickness depending upon the thickness of the particular film or web to be stretched. In the case of thermoplastic films, they change in thickness as the film is stretched. Hence, spacers 60 in stretcher units near the outlet pull rolls should be thinner than those near the feed roll to compensate for changes in film thicknesses. In some cases the spacers in adjacent stretcher units are progressively thinner from the feed to outlet rolls. As shown in Fig. 4 the roller end of the bolt is threadably engaged with the rail but obviously it can be passed through a hole in the rail and secured by means of a nut and spacing washers if desired. It will be noted that the rollers 24 are ball-bearing rollers and they consist of an inner raceway 62 which is adjacent to the surface of stub shaft 25 and an outer raceway constituting the effective roller. Balls 63 are placed between the inner and outer raceways of roller 24. As shown, the inner raceway abuts an elongated head on stub shaft 25. A washer 64 is placed between the roller bearing and the face of bracket 26. The outer end of stub shaft 25 is provided with an annular groove into which there is fitted a spring ring 65.

In the alternative construction of Fig. 5 one of the rollers is fastened to the rail directly by threading the end of the stub shaft as shown at 67 for engagement with a threaded recess 68 in the underside flange of the rail. The lower rollers are bolted to a second support 69, which, in turn, are fastened to the lower flange of the rail by means of threaded bolts 70 which engage with threaded orifices 71 in said rail. In this construction, the web passes over the outer surfaces of both rollers and the beaded surface engages with the edge of the lower roller only. The invention, of course, is not limited to the two constructions shown as the upper roller support could well be below the upper roller and separate or unitary with the support for the lower roller, etc.

In the case of polyethylene terephthalate films it has been found to be desirable to keep the edges of the web under controlled temperature below that of the web proper during the stretching operation. This may be advantageously accomplished by placing a tube or tubes, for the circulation of a heat-transfer fluid, near the rollers on the U-shaped brackets. Thus, in Fig. 1, there is shown such a tube 72 which is bent to interfit with the brackets. It can be straight and between brackets and maintained with spring clips 72' as shown in Fig. 4. A plurality of cooling tubes can be used. For instance, two tubes can be clipped to or otherwise mounted on the upper and lower brackets and close to the rollers if desired. The tube 72 can be continuous or composed of several sections. Thus, it may be a copper, brass or aluminum pipe through which a heat-exchange fluid may be passed to control the temperature of the guiding rollers along a given length. In normal operation of the apparatus shown in Fig. 1 the cooling tubes start at or beyond the first inclined bracket where lateral stretching starts. The exact point will depend on the rate of stretch, machine speed, viscosity of the material, etc. The cooled rollers reduce the temperature of the thickened edges of the film and enable it to withstand the forces required to stretch or orient the film. The heat-exchange tube may be disposed along either the upper or lower or both U-shaped brackets for the sake of ease in assembly and repair.

In Fig. 8 the lower end of the rail 28" is mounted on an antifriction unit consisting of two rollers 73 which are journalled in slots at the opposite ends of carriages 74 by shafts 75.

The operation of the apparatus will now be explained with reference to the stretching of a thermoplastic film, e. g., a non-oriented polyethylene terephthalate film of the type described in Whinfield et al. U. S. Patent 2,465,319. A web 23 of non-oriented or non-stretched polyethylene terephthalate film free from any surface coating, or provided with a thin coating of a vinylidene chloride copolymer of the kind described in Alles & Saner U. S. application Ser. No. 151,274, filed March 22, 1950, now Patent Number 2,627,088 and in Pitzl U. S. Patent 2,570,478 or other treatments is fed, (1) directly from an extrusion device or casting surface whereby the edges are thickened or (2) from a treating apparatus where a thin sublayer is applied as in Patent No. 2,627,088, or (3) from a supply roll (not shown), to a point between feed rolls 2.

In starting the apparatus for the first time the web may be slit at its center and threaded between the pairs of guiding rollers throughout the entire roll and then between outlet pull rolls 21. The slitting operation is, of course, only done for that length of web necessary to thread the entire apparatus. Once the machine is in operation, it will pull the unbroken web continuously from the feed rolls through the outlet pull rolls. The slit section of the film can be cut off and the continuous length of stretched or oriented film which follows passed to a windup station or into other treating apparatus not shown.

Alternatively, rails 28' and 28" can be made parallel or at a slight angle with rail 28 by adjusting screws 42 and piston rods 33 to permit this. While the rods and screws as shown are not long enough to permit this in actual practice, they are longer. They have been shortened so as not to interfere with other parts on the drawing. After the web has been preheated properly the desired longitudinal stretch is set. Then the guide rails 28 are moved outwardly by the adjusting rods 33 to the adjusting screws 40 so that the lateral stretch is combined with the longitudinal stretch. The web may now be cut and the continuous length of stretched or oriented web which follows may be passed to a windup station or into other treating apparatus not shown.

The operation of the apparatus will now be further illustrated by the following examples which are not intended to limit the invention.

Example I

A non-oriented polyethylene terephthalate film element having a cross section as shown in Fig. 6 wherein the body of the film is about 4.25 inches wide and has a thickness of approximately 0.036 inch and the edges have a thickness of approximately 0.110 inch for a distance approximately 0.125 inch in from the edge, is passed between feed rolls 2 of the apparatus shown in Fig. 1 at the rate of 60 inches per minute. It passes over the radiant heating unit 45, which is adjusted to heat the film to a temperature of about 85° to 95° C., with effective operation at a temperature as low as 70° C., and then between the various guiding rollers and between the outlet pull rollers 21. The film is biaxially stretched in the zone between walls 43 and 44, which chamber is maintained at a temperature of 85° to 95° C. The chamber between wall 44 and the end of the frame is maintained at a temperature of about 50° C. or less. The outlet pull rolls rotate at such a speed that the web emerges between said rollers at a speed of about 180 inches per minute. The width of the film between the thickened edges as it emerges from the stretching apparatus is about 12.75 inches and the thickness about 0.004 inch. Water at a temperature of about 45° to 55° C. is passed into the entrance end of tube 72 to cool the rollers and beaded edge of the film.

Example II

A non-oriented polyethylene terephthalate film having a cross section as shown in Fig. 7, a width between the thickened edges of about 4.25 inches, a thickness of approximately 0.036 inch and an edge thickness of approximately 0.080 inch for a distance of approximately 0.125 inch is passed between the feed rolls of the first stretching apparatus of Fig. 2 at the rate of 90 inches per minute. The film passes over radiant heating unit 45, which is adjusted to heat the film in the first temperature-regulated zone to a temperature of about 85° to 95° C., with effective operation as low as 75° C. The film then passes through the two rows of spaced guide rollers, between the outlet pull rolls 21 to a windup station or into another apparatus for further treatment; e. g., coating operations, etc. Air at a temperature of about 85–95° C. is circulated through the central temperature zone where the main stretching action takes place. Air at a temperature of about 23° C. is circulated through the third or end zone. The outlet pull rolls rotate at such a speed that the web emerges between said rolls at a speed of about 270 inches per minute. By varying the peripheral rate of speed of the feed rolls and outlet pull rolls, the amount of longitudinal stretch of the film can be varied. Thus, if the feed (peripheral) roll speed is X inches per minute, the outlet speed may vary from 1.5 X inches per minute to 4 X inches per minute. The value of X varies according to the thickness of the film produced, viscosity, etc. A suitable range of feed roll speed is 50 to 1,000 inches per minute. By maintaining the width of the film constant during passage through the apparatus, the desired degree of orientation can be obtained.

Example III

A non-oriented polyethylene terephthalate film element having the same cross section and dimensions as that described in Example II is passed through the first stretching apparatus of Fig. 2 in a manner similar to that described in Example II except that the second and third heating zones are maintained at a temperature of about 80° to 85° C. The film then passes into the second stretching apparatus or tenter frame of Fig. 2 which is maintained at a temperature of from 85°–95° C. though 80° to 100° is effective operating range. The speed of the web as it enters the second stretching unit should be the same as that at which it emerges from the first stretching apparatus. The speed of the web as it leaves the second stretching unit may be the same or greater than that at which it enters the second unit.

The temperature in the various temperature-regulated zones of the stretching apparatus described above may, of course, vary considerably depending on the nature of the particular web or film to be stretched or oriented. The amount of heat applied can, of course, be further regulated by varying the positions of walls 43 and 44, and particularly the latter, which need not be fastened to the side walls of the frame. Thus, it may be in the form of a folded screen as shown. The partition walls and cover plates for the chambers may be made of various sheet materials, e. g., iron, copper, aluminum, stainless steel. The frame can be made of similar materials but is preferably made of structural steel for strength and rigidity.

The U-shaped brackets which support the guide rollers can be made of any of the various metals and metal alloys that are used in machines, e. g., iron, steel, aluminum, brass, copper, bronze, etc.

The feed and outlet rolls can be made of various metals and their surfaces, in general, should be highly polished and free from imperfections which would leave objectionable markings on the surface of the web or film. Thus, the rolls may be composed of steel which is plated with copper, brass, nickel, chromium, cadmium, etc., or a plurality of such metals. The surface of the rolls may also be composed of stainless steel, nickel-copper alloys or other corrosion resisting alloys which can be polished. The surface of the rollers can also be coated with various organic materials, e. g., silicone resins, rubber, polyethylene, polytetrafluorethylenes, etc.

With regard to the guiding rollers they are preferably made of steel, for purposes of strength and long wear, but, of course, can be made of various other materials which are capable of withstanding high temperatures and are resistant to wear.

It will be noted that the guiding rollers that are shown are divided into small units which are mounted on U-shaped brackets. As shown, the units consist of 11 to 12 rollers. However, these units may consist of any desired number, say from 6 to 20 or more.

The brackets are U-shaped for ease of assembly, adjustment and replacement. The tube for the circulation of a heat exchange fluid follows the contour of the bracket so that it will not interfere with the operation of the rollers. It is near a majority of the rollers in each unit. The brackets can, of course, be made in other shapes and the heat exchange tube may be disposed in other ways. Thus, it may follow along the lines of the rollers and not as a continuous flexible tube having a U-shaped section as shown. Suitable heat exchange fluids for circulation through the tubes include water, ethylene glycol, paraffin hydrocarbon oils of low viscosity, diphenyl oxide, chlorinated diphenyl.

In place of the hydraulic cylinders used as shown for adjusting the position of the rolls there can be substituted various other means for gradually adjusting the position of such rails, e. g., a cross head screw which can be actuated by means of handwheel, a rack and a gear mechanism, etc.

The feed rolls 2 and 2' need not be mounted within the first chamber but can be placed just in front of the chamber on a suitable adjustable support so that the bearings for the upper roll can be adjusted vertically to or from the lower roll. The upper roll preferably is spring loaded so that it will adjust to the thickness of the film or web. Outlet pull rolls can be similarly mounted. Suitable mountings, which can be disposed vertically, are shown in U. S. Patents 2,487,061 and 2,530,407.

It will be apparent to those skilled in the art that the present invention is not limited to the stretching of polyethylene terephthalate films but may be used in stretching webs or films of many diverse materials. Suitable additional materials which can be stretched include not only resins and superpolymers, e. g., nylon, polyethylene, polystyrene, polyvinyl halides, e. g., polyvinyl chloride, polyvinyl acetate, rubber hydrochloride; cellulose derivatives, e. g., cellulose acetate, cellulose formate, cellulose propionate, cellulose acetate butyrate; methyl, ethyl, butyl, benzyl, allyl and crotyl ethers of cellulose; polyesters from glycols and aliphatic dibasic acids, polyesteramides, etc. These films, moreover, may be coated with various thin layers including the vinylidene chloride copolymers described in Alles et al. U. S. Patent 2,491,023 and in aforementioned application Ser. No. 151,274. It can also be used for stretching fabrics by providing a thickened edge, e. g., a rolled hem or raised selvage.

An advantage of this invention is that it provides a simple and practical apparatus for stretching thermoplastic films without scoring, abrading, marring or scratching the surfaces of the film. The guiding rollers contact with the thickened edges of the film and support it during its travel through the apparatus. The surface of the film, while hot, therefore, is not in contact with rolls, etc., during the stretching period and thus can be made free from surface markings. A further advantage of the invention resides in the fact that friction is reduced to a negligible amount due to the roller guides. This advantage is of importance with thermoplastic films such as polyethylene terephthalate because of the high coefficient of friction between the thermoplastic film at the stretching temperature and guiding surfaces of known types of stretching apparatus.

Another advantage of the apparatus is that it is easy to assemble and adjust. Still another advantage is that the parts are relatively simple in construction and do not require any precision machining operations.

As many widely different embodiments of this invention can be made without departing from the spirit and scope thereof, it is to be understood that the invention is not to be limited except as defined by the claims.

What is claimed is:

1. A web stretching apparatus comprising a frame, web feed rolls near one end and outlet pull rolls near the other end, means for rotating said feed and outlet rolls at differential rates of speed so that the web having thickened edges to be stretched is under tension between the feed and outlet rolls, two spaced rows of a plurality of coacting pairs of idler guide rollers, one row being placed on one side and the other on the opposite side of the axis of the path of the web between the feed and outlet rolls, the axis of the rollers in each pair being at opposite angles from each other and at an angle from the plane of the web, one roller of each pair being placed above and the other below the plane of the web near its thickened edge so that each thickened edge of the web will contact the peripheral edges of at least one of the same rollers of each pair in a respective row, said pairs of rollers in each row being mounted on a respective rail, said spaced rows of rollers coacting with the thickened edges of the web to keep it under lateral tension in a predetermined path during its passage from the feed rolls to the outlet rolls.

2. A web stretching apparatus comprising a frame, web feed rolls mounted on said frame near one end, outlet pull rolls near the other end, means for rotating said feed and outlet rolls at differential rates of speed so that the web having thickened edges to be stretched is under tension between the feed and outlet rolls, two spaced rows of a plurality of coacting pairs of idler guide rollers, one row being placed on one side and the other on the opposite side of the axis of the path of the web between the feed and outlet rolls, the axis of the rollers in each pair being at opposite angles from each other and at an angle from the plane of the web, one roller of each pair being placed above and the other below the plane of the web near its thickened edge so that each thickened edge of the web will contact the peripheral edges of at least one of the same rollers of each pair in the respective row, said pairs of rollers in each row being mounted on a respective rail, at least one section of each rail containing a plurality of pairs of rollers and being adjustable laterally from the axis of the path of the web, said spaced rows of rollers coacting with the thickened edges of the web to keep it under lateral tension in a predetermined path during its passage from the feed rolls to the outlet rolls.

3. A film stretching apparatus comprising a frame, film feed rolls mounted on said frame near one end, outlet pull rolls near the other end, means for rotating said feed and outlet rolls at differential rates of speed so that the thermoplastic film having thickened edges to be stretched is under tension between the feed and outlet rolls, two spaced rows of a plurality of coacting pairs of idler guide rollers, one row being placed on one side and the other on the opposite side of the axis of the path of the film between the feed and outlet rolls, the rollers in each pair being disposed at opposite angles from the plane of the film, and their axes having an apex in the film close to its thickened edge, one roller of each pair being disposed above and the other below the film near its thickened edge so that the adjacent edge of said film contacts adjacent peripheries of said rollers in the respective row, the thickened edge contacting the peripheral edges of the same rollers of each pair, said pairs of rollers in each row being mounted on a rail at least one section of which contains a plurality of pairs of such idler rollers and is adjustable laterally from the axis of the path of the film, said spaced rows of rollers coacting with the thickened edges of the film to keep it under lateral tension in a predetermined path during its passage from the feed rolls to the outlet rolls, means for heating the film prior to its passage into contact with said guide rollers, and means for regulating the temperature of the edges of said film while passing between said rollers and separate means for controlling the temperature of the apparatus between the rolls.

4. A film stretching apparatus comprising a frame, film feed rolls mounted on said frame near one end, outlet pull rolls near the other end, means for rotating said feed and outlet rolls at differential rates of speed so that the thermoplastic film having thickened edges to be stretched is under tension between the feed and outlet rolls, two spaced rows of a plurality of coacting pairs of idler guide rollers, one row being placed on one side and the other on the opposite side of the axis of the path of the film between the feed and outlet rolls, the rollers in each pair being disposed at opposite angles from the plane of the film, and their axes having an apex in the film close to its thickened edge, one roller of each pair being disposed above and the other below the film near its thickened edge so that the adjacent edge of said film contacts adjacent peripheries of said rollers in the respective row, the thickened edge contacting the peripheral edges of the same rollers of each pair, said pairs of rollers in each row being mounted on a rail at least one section of which contains a plurality of pairs of such idler rollers and is adjustable laterally from the axis of the path of the film, said spaced rows of rollers coacting with the thickened edges of the film to keep it under lateral tension in a predetermined path during its passage from the feed rolls to the outlet rolls, means for heating the film prior to its passage into contact with said guide rollers, and means for regulating the temperature of the edges of the film while passing between said rollers, and a plurality of separate means for selectively controlling the temperature of various zones of the apparatus between the feed rolls and outlet rolls.

5. A web stretching apparatus comprising a frame, web feed rolls near one end of said frame, outlet pull rolls near the other end, means for rotating said feed and outlet rolls at differential rates of speed, two spaced rows of a plurality of pairs of idler guide rollers placed on each side of the axis of the path of the web which has thickened edges to be stretched between the feed and outlet rolls, one roller of each pair being disposed adjacent to one surface and the second one being disposed adjacent to the other surface of the web near its adjacent lateral thickened edge so that the thickened portion of the web will contact the peripheral edges of the same rollers of each pair, said spaced rows of rollers coacting with the thickened edges on said web to keep the web under lateral tension in a predetermined path, each of said rows of pairs of rollers being divided into units that are mounted on brackets which are mounted on rails on said frame to form said path, means for heating the web prior to its passage between said guide rollers, and means for regulating the temperature of the edges of said web while passing between said rollers and separate means for controlling the temperature of the web between the rolls.

6. An apparatus as set forth in claim 5 in combination with a web stretching device for further stretching said web laterally.

7. A web stretching apparatus as set forth in claim 5 in combination with a tenter frame for further stretching said web laterally which is provided with separate chambers for varying the temperature of the web.

8. A web stretching apparatus comprising a frame, web feed rolls near one end of said frame, outlet pull rolls near the other end, means for rotating said feed and outlet rolls at differential rates of speed, two spaced rows of a plurality of pairs of idler guide rollers placed on each side of the axis of the path of the web which has thickened edges to be stretched between the feed and outlet rolls, one roller of each pair being disposed adjacent to one surface and the second one being disposed adjacent to the other surface of the web near its adjacent lateral thickened edge so that the thickened portion of the web will contact the peripheral edges of at least one of the same rollers of each pair, said spaced rows of rollers coacting with the thickened edges on said web to keep the web under lateral tension in a predetermined path, said rows of pairs of rollers being divided into units that are mounted on U-shaped brackets which are mounted on rails on said frame to form said path, at least one opposing section of each of said rails containing a plurality of such units and being adjustable laterally, means for heating the web prior to its passage between said guide rollers, and means for regulating the temperature of the edges of said web while passing between said rollers and separate means for controlling the temperature of the web between the rolls.

9. A film stretching apparatus comprising a frame, film feed rolls mounted on said frame near one end, outlet pull rolls near the other end, means for rotating said feed and outlet rolls at differential rates of speed so that the thermoplastic film having thickened edges to be stretched is under tension between the feed and outlet rolls, two spaced rows of a plurality of coacting pairs of idler guide rollers placed on opposite sides of the axis of the path of the film between the feed and outlet rolls, the rollers in each pair being disposed at opposite angles from the horizontal, and their axis having an apex in the film close to its thickened edge, one roller of each pair being disposed above and the other below the film near the respective thickened edge so that the adjacent edge of said film contacts adjacent peripheries of said rollers, the thickened edge contacting the peripheries of the same rollers in each pair, said pairs of rollers being mounted on a rail in each row, at least one section of which contains a plurality of pairs of rollers and is adjustable laterally from said axis, said pairs of rollers divided into units that are mounted on U-shaped brackets which are mounted on said rails, said brackets being provided with a tube for circulating a heat-exchange fluid near at least a plurality of the rollers, said spaced rows of rollers forming a confined path which coacts with the thickened edges of the film to keep it under lateral tension during its passage from the feed rolls to the outlet rolls, means for heating the film prior to its passage into contact with said guide rollers, and separate means for controlling the temperature of the apparatus between the rolls.

10. A film stretching apparatus as set forth in claim 9 in combination with a film stretching device for further stretching said film laterally.

11. A film stretching apparatus as set forth in claim 9 in combination with a tenter frame for further stretching said film laterally, which tenter frame is provided with separate chambers for varying the temperature of the film.

References Cited in the file of this patent

UNITED STATES PATENTS

| | | |
|---|---|---|
| 1,979,762 | O'Kane et al. | Nov. 6, 1934 |
| 2,079,584 | Hazell et al. | May 4, 1937 |
| 2,297,645 | Bailey | Sept. 29, 1942 |
| 2,328,827 | Martin | Sept. 7, 1943 |
| 2,342,891 | Powers | Feb. 29, 1944 |
| 2,412,187 | Wiley et al. | Dec. 3, 1946 |
| 2,490,781 | Cloud | Dec. 13, 1949 |
| 2,505,146 | Ryan | Apr. 25, 1950 |
| 2,571,355 | Gardner | Oct. 16, 1951 |

FOREIGN PATENTS

| | | |
|---|---|---|
| 400,597 | Great Britain | Oct. 23, 1933 |